(12) United States Patent
Fischer

(10) Patent No.: US 11,965,979 B2
(45) Date of Patent: Apr. 23, 2024

(54) TEST DEVICE FOR TESTING A DETECTION DEVICE FOR RADAR AND/OR ULTRASOUND

(71) Applicant: Bayerische Motoren Werke Aktiengesellschaft, Munich (DE)

(72) Inventor: Jonathan Fischer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 626 days.

(21) Appl. No.: 15/734,142

(22) PCT Filed: Jul. 4, 2019

(86) PCT No.: PCT/EP2019/067954
§ 371 (c)(1),
(2) Date: Dec. 1, 2020

(87) PCT Pub. No.: WO2020/011635
PCT Pub. Date: Jan. 16, 2020

(65) Prior Publication Data
US 2021/0215796 A1 Jul. 15, 2021

(30) Foreign Application Priority Data
Jul. 9, 2018 (DE) .................... 10 2018 211 289.4

(51) Int. Cl.
*G01S 7/40* (2006.01)
*G01S 7/52* (2006.01)
(Continued)

(52) U.S. Cl.
CPC ........ *G01S 7/4052* (2013.01); *G01S 7/52004* (2013.01); *G01S 7/4086* (2021.05);
(Continued)

(58) Field of Classification Search
CPC .. G01S 7/4052; G01S 7/52004; G01S 7/4086; G01S 7/4095; G01S 13/931;
(Continued)

(56) References Cited

U.S. PATENT DOCUMENTS

| | | | | |
|---|---|---|---|---|
| 5,294,935 A | * | 3/1994 | Bauerle | G01S 7/4004 342/174 |
| 5,485,158 A | * | 1/1996 | Mailloux | G01R 29/10 342/165 |
| 2009/0046002 A1 | * | 2/2009 | Tsunoda | G01S 7/4052 342/172 |

FOREIGN PATENT DOCUMENTS

| | | |
|---|---|---|
| CN | 1045650 A | 9/1990 |
| DE | 29 29 814 A1 | 1/1981 |

(Continued)

OTHER PUBLICATIONS

PCT/EP2019/067954, International Search Report dated Nov. 7, 2019 (Two (2) pages).

(Continued)

*Primary Examiner* — Bernarr E Gregory
(74) *Attorney, Agent, or Firm* — Crowell & Moring LLP

(57) ABSTRACT

A test device for testing a detection device includes a reflection element with reflective surface where the reflective surface is a radar reflective surface and/or an ultrasound reflective surface. The reflection element is movable by a drive device periodically back and forth in a translational movement along a movement axis with respect to a housing of the test device. A movement of the reflection element produces a relative speed unequal to zero of the test device with respect to the detection device.

10 Claims, 4 Drawing Sheets

(51) Int. Cl.
*G01S 13/931* (2020.01)
*G01S 13/00* (2006.01)

(52) U.S. Cl.
CPC ........... *G01S 7/4095* (2021.05); *G01S 13/931* (2013.01); *G01S 2013/9324* (2020.01); *G01S 2013/93271* (2020.01)

(58) Field of Classification Search
CPC ... G01S 2013/9324; G01S 2013/93271; G01S 7/521; G01S 13/583; G01S 15/586; G01S 15/931; G01S 7/4004; G01M 17/007; G01R 29/10
See application file for complete search history.

(56) References Cited

FOREIGN PATENT DOCUMENTS

| DE | 10 2004 054 513 A1 | 9/2005 | |
|---|---|---|---|
| DE | 102013010140 B3 * | 7/2014 | .......... G01M 17/007 |
| DE | 10 2014 118 625 A1 | 6/2016 | |
| DE | 11 2016 000 274 T5 | 10/2017 | |
| EP | 1 750 141 A1 | 2/2007 | |

OTHER PUBLICATIONS

German Search Report issued in German application No. 10 2018 211 289.4 dated Jun. 6, 2019, with Statement of Relevancy (Nine (9) pages).

\* cited by examiner

TEST DEVICE FOR TESTING A DETECTION DEVICE FOR RADAR AND/OR ULTRASOUND

BACKGROUND AND SUMMARY OF THE INVENTION

The invention relates to a test device for testing a detection device for radar and/or ultrasound. The test device is designed to generate in measurement data of the detection device a predetermined speed signature, which signals a relative speed unequal to zero with respect to the detection device.

In a motor vehicle, a radar device may be provided as a detection device, in order thus to be able to detect a relative distance and a relative speed of a traffic object in the surrounding area of the motor vehicle. In order to be able to check and/or calibrate such a radar device, for example after installation in the motor vehicle, the test device may be arranged as a test object in the surrounding area of the motor vehicle and a radar measurement then carried out by means of the radar device to be tested and/or calibrated. However, then the radar measurement shows not only measurement data of the test object itself, but for example also measurement data relating to background objects. In order to be able to identify the measurement data belonging to the test object in the measurement result, it may for example be envisaged to move the test object at a known relative speed with respect to the motor vehicle during the radar measurement. Then all of the measurement data for which the corresponding relative speed is obtained from the measurement data can be identified in the measurement result as belonging to the test object. This is also referred to as a speed signature, with which the test object is provided in order to be able to distinguish or delimit it from the (stationary) background objects in the radar measurement.

Since, however, the movement of the test object requires a correspondingly great freedom of movement, there is an interest in imparting the speed signature to the test object in a space-saving way.

It is known to the inventor that for this purpose it is possible to provide in the test object a so-called Doppler generator, which only moves a radar-reflective surface of the test object, while the remaining part of the test object can be stationary. This also causes in the radar measurement measurement data that signal for the test object a relative speed which corresponds to the speed of movement of the reflective surface. In order to provide a moved surface on a test object, the use of a metal radial fan is known to the inventor. In order however to generate a reliably recognizable speed signature in the radar measurement, for this purpose the blades of the radial fan must be chosen to be correspondingly large, for example more than 100 square centimeters per blade. This results in a radial fan of a correspondingly large design, which has to be arranged and operated in the test object in order to obtain the speed signature.

The described testing and/or calibrating measurements may also be necessary for an ultrasound device, so that here too a speed signature may be advantageous.

The invention is based on the object of providing as a test object a test device for providing a speed signature for a radar and/or ultrasound measurement.

According to the invention, it is envisaged to provide in the test device a reflection element with a radar- and/or ultrasound-reflective surface and to move this reflection element periodically back and forth in a translational manner along a movement axis by means of a drive device.

According to the invention, provided for this purpose is a test device which is designed to test a detection device for radar and/or ultrasound. The detection device may for example be installed in a motor vehicle. The test device may be arranged stationarily in a surrounding area of the detection device to be tested, in particular in a surrounding area of a motor vehicle. The test device is designed to generate in measurement data of the detection device a predetermined speed signature, which signals a relative speed unequal to zero with respect to the detection device. Although the test device is therefore arranged stationarily in the surrounding area of the detection device, measurement funnel data which signal a relative speed of the test device unequal to zero with respect to the detection device are obtained in the detection device.

In order to realize this in a space-saving manner, in the test device a reflection element with a radar- and/or ultrasound-reflective surface is provided and a drive device which is designed to move this reflection element periodically back and forth in a translational manner along a movement axis with respect to a remainder of the test device is provided. In other words, the reflection element is pushed back and forth in the test device. Consequently, the reflection element oscillates along the movement axis. This movement axis may be aligned with the detection device. This produces for the reflection element a relative speed unequal to zero with respect to the detection device, while the reflection element is moved in a translational manner along the movement axis. Unlike in the case of a fan impeller, there is no need here for a rotation about an axis of rotation, which would take up unnecessary movement space.

The invention gives rise to the advantage that a reflection element which is relatively movable with respect to the detection device and by which the described speed signature can be imparted to the measurement data of the detection device is provided in a space-saving manner in the test device. Apart from the points of inflection in the oscillating movement of the reflection element, the other phases of movement can be used to provide the measurement data with a speed signature.

The invention also includes embodiments by which additional advantages are obtained.

In one embodiment, the reflection element is designed as a diaphragm. The diaphragm surface is in this case provided as the reflective surface. The reflection element can in the case of this embodiment be compared with a loudspeaker diaphragm. A diaphragm may be provided as a film or fabric and may for example be stretched over a supporting frame. A diaphragm has the advantage that it has a low weight, so that the drive device can bring about the movement of the reflection element with little expenditure of energy. The diaphragm may be perforated, in order to avoid unnecessary sound generation.

In one embodiment, the reflection element has a funnel shape with three respectively planar funnel walls, extending perpendicularly to one another in pairs. The reflective surface is provided here by funnel inner sides of the funnel shape. Such a funnel shape with two or three funnel walls extending perpendicularly to one another in pairs is also referred to as a corner reflector or radar reflector. The funnel shape has the advantage that radar waves and/or ultrasound waves of the detection device itself are then reflected back to it by the reflection element if the movement axis is aligned at an angle unequal to zero, that is to say obliquely, in relation to the connecting line between the reflection element and the detection device. In other words, an exact alignment of the reflection element with respect to the detection device is not necessary. The funnel shape may be realized here by the diaphragm or by plates or a casting mold. The funnel shape may for example also be realized by means of a plastic, for example by an injection-molded component, and the funnel inner sides may be provided with the reflective surface.

In one embodiment, the drive device has an electrical plunger coil, which is arranged around a permanent magnet and/or in or around a further electrical coil. In other words, the drive device is designed in a way corresponding to the drive device of a loudspeaker. The use of a permanent magnet here is energy-efficient, since the magnetic field for the plunger coil is provided without additional expenditure of energy. The use of a further electrical coil has the advantage that the field strength of the magnetic field for the plunger coil can be set by means of the coil current of the further electrical coil. A coil current of the electrical plunger coil itself can be varied in current intensity according to the specified movement of the reflection element. Then the plunger coil moves with respect to the permanent magnet and/or the further electrical coil according to the desired movement of the reflection element, which is then also moved by the electrical plunger coil. In particular, the reflection element may be designed as a loudspeaker diaphragm which is moved back and forth by means of an electrical plunger coil (like a loudspeaker).

In one embodiment, the drive device has a rotary motor and the reflection element is mechanically coupled to a rotor of the rotary motor by way of a rod element. The rotary motor may be designed for example as an electrical rotary motor. The rod element may be realized for example on the basis of a rod of metal or plastic. By means of the rod element, a rotational movement of the rotor is transformed into the translational movement of the reflection element. Such a combination of a rotary motor and a rod element is also referred to as a rod drive. It is for example known from steam locomotives. The embodiment has the advantage that the rotary motor itself does not have to perform the reversal of the direction of movement even if the reflection element is moved periodically back and forth in a translational manner along the described movement axis. As a result, the drive device is energy-efficient.

In one embodiment, the drive device is designed to set an oscillation frequency or a period duration of the translational movement of the reflection element in dependence on an actuating signal. For example, for this purpose the movement speed and/or the movement amplitude of the reflection element may be set in dependence on the actuating signal. As a result, the adjustable period duration of the periodic, translational movement of the reflection element is then obtained. This embodiment has the advantage that the period duration of the translational, periodic movement of the reflection element can be adapted to a measurement signal (radar waves and/or ultrasound waves) of the detection device. As a result, it can be advantageously prevented that the reflection element comes to a standstill at the point of reversal of its periodic movement during a measuring cycle of the detection device, and as a result the desired speed signature is not produced.

In one embodiment, the translational movement has a sinusoidal speed profile. In other words, a speed function of the reflection element may correspond to a sinusoidal time function. This gives rise to the advantage that the reflection element does not just have a single, constant speed but has a number of different speed values in the course of a period of the periodic movement. This produces a speed profile with a number of different speed values. This makes it easier to recognize the test device in the measurement data of the detection device.

In one embodiment, the reflective surface is provided by a metal body or by a metal-coated, nonmetallic supporting body. In connection with the invention, a metal body has a thickness (measured perpendicularly to the reflective surface) which is greater than 100 micrometers. The metal body may for example be formed on the basis of at least one metal plate. A metal body has a greater degree of reflection than a metal coating (thickness measured perpendicularly to the reflective surface, less than 100 micrometers). A metal-coated, nonmetallic supporting body may in contrast thereto be provided with a lower weight than a metal body.

In one embodiment, the movement stroke or movement path of the periodic translational movement of the reflection element is less than 20 centimeters. The remainder of the test device may remain stationary in the way described. The movement stroke of less than 20 centimeters has the effect that the space requirement for the test device during operation is low.

In one embodiment, the reflection element has on the reflective surface a perforation comprising a number of through-openings. As a result, the air resistance of the reflection element is reduced. This reduces the energy requirement for the movement. The perforation also reduces the generation of sound in comparison with an absent perforation.

In one embodiment, a cross section of the reflective surface has a maximum dimension in a range from three centimeters to 50 centimeters. As a result, the test device can be of a portable design.

The invention also includes a method for generating the described speed signature in measurement data of a detection device for radar and/or ultrasound. In a surrounding area of the detection device, an embodiment of the test device according to the invention is arranged. The test device can then be put into operation, that is to say that in the test device a reflection element which has a radar- and/or ultrasound-reflective surface is moved periodically back and forth in a translational manner along a movement axis by means of a drive device of the test device with respect to the remainder of the test device. A radar- and/or ultrasound-based measurement signal of the detection device is then reflected back to the detection device by means of the surface of the moved reflection element. Since this reflection of the measurement signal is brought about by the moved surface, the speed signature is imparted to the measurement signal as known per se for measurement signals on the basis of radar waves and/or ultrasound waves. In other words, on the basis of the measurement signal reflected at the surface, a relative speed of the reflection element of the test device is recognized in the measurement data of the detection device by the detection device after receiving the reflected measurement signal. Consequently, the measurement signal reflected at the moved surface can be recognized in the measurement data of the detection device on the basis of the speed signature and/or can be distinguished from reflected measurement signals from a surrounding area of the test device.

In one embodiment, in the measurement signal a ramp function or chirp function has a predetermined time duration, and a period duration of the reflection element moved periodically back and forth is set in such a way that it is more than twice the time duration. In addition, the movement of the reflection element may be synchronized with a point in time of the emission of the measurement signal. This gives rise to the advantage that, during the course of the ramp function or chirp function, the reflection element can continuously perform a movement in one direction, so there is no reversal of movement and consequently a standstill of the reflection element during the course of the ramp function or chirp function. As a result, the speed signature is continuously unequal to zero.

The invention also comprises the combinations of embodiments described.

Further features of the invention emerge from the claims, the Figures and the description of the Figures. The features and combinations of features mentioned above in the description and the features and combinations of features mentioned in the description of the Figures below and/or shown in the Figures alone can be used not only in the respectively stated combination but also in other combinations or alone.

The invention is now explained in more detail on the basis of a preferred exemplary embodiment and also with reference to the drawings.

DETAILED DESCRIPTION OF THE DRAWINGS

In the Figures, the same designations indicate elements that are functionally the same.

Figure 1:
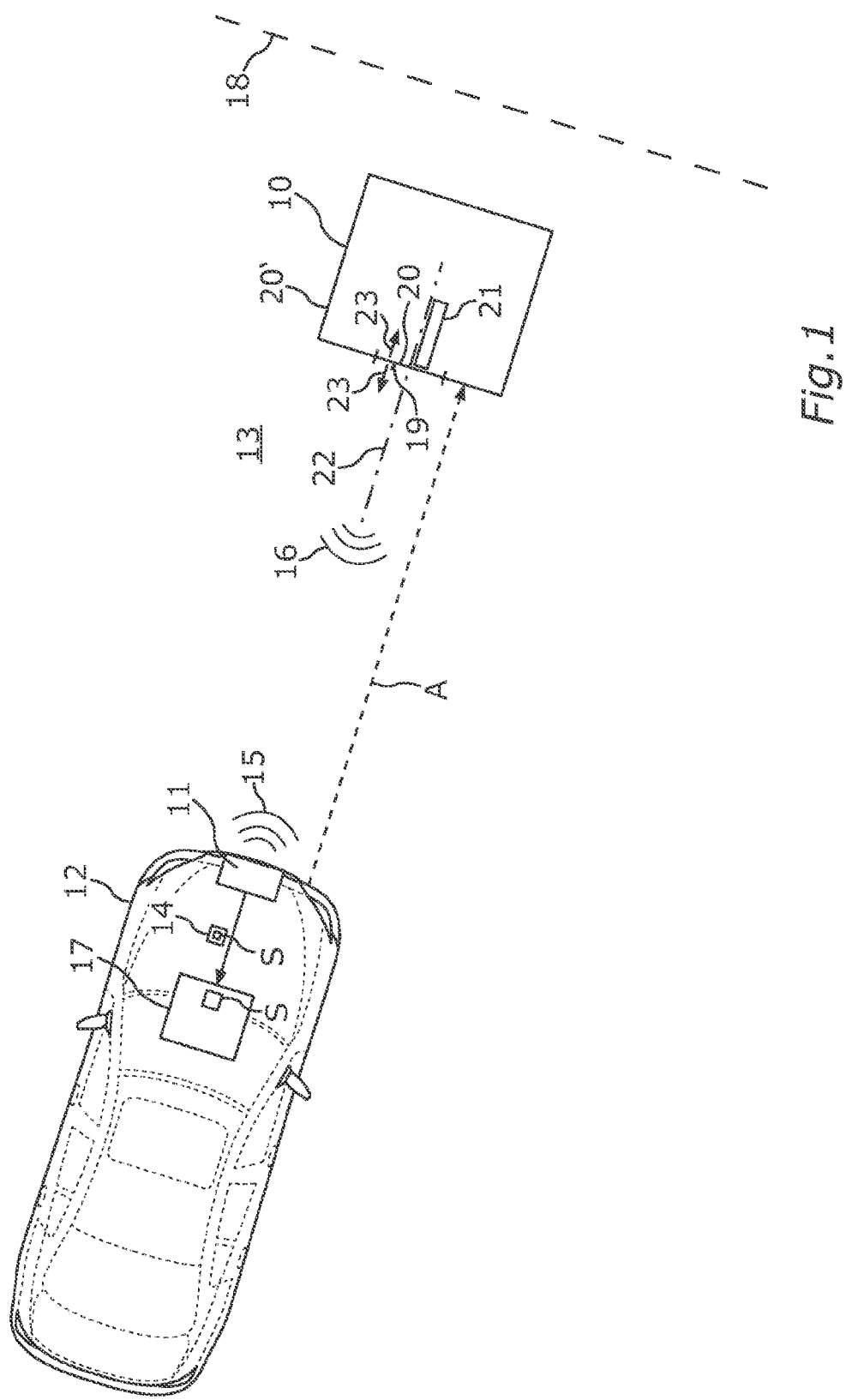
FIG. 1 shows a schematic representation of an embodiment of the test device according to the invention during implementation of an embodiment of the method according to the invention.

FIG. 1 shows a test device 10, which may be designed for example as a portable device. The test device 10 may be intended for testing a detection device 11, which may for example be installed in a motor vehicle 12 or be provided for a motor vehicle 12. For this purpose, the test device 10 may be arranged in a surrounding area 13 of the detection device 11. The test device 10 may be located here immovably on the ground of the surrounding area 13. A distance A between the detection device 11 and the test device 10 may lie in a range from 20 centimeters to 20 meters, just to give examples.

The detection device 11 also does not have to be moved. The detection device 11 may for example have a radar sensor and/or an ultrasound sensor. The detection device 11 may for example be designed as a radar device for a driver assistance system and/or as an ultrasound-based parking aid and/or blindspot monitor. The detection device 11 may therefore be a radar device and/or ultrasound device. The detection device 11 may generate measurement data 14, in which objects in the surrounding area 13, in particular the test device 10, can be detected or depicted. For this purpose, the detection device 11 may in a known way emit a measurement signal 15, which may be based on radar waves and/or ultrasound waves. The measurement signal 15 may be reflected at the test device 10 and a reflected measurement signal 16 may be measured or detected by the detection device 11. The measurement data 14 can be generated in dependence on the reflected measurement signal 16. The measurement data 14 may be evaluated in a way known per se by a testing device or calibrating device 17. For example, it can be checked whether the test device 10 is detected at a correct or predetermined location by means of the detection device 11. In order to be able to distinguish in the measurement data 14 the reflected measurement signal 16 from the test device 10 from reflected measurement signals of a background or at least some other object 18, a speed signature or a speed profile is imparted to the reflected measurement signal 16 by the test device 10. For this purpose, for generating the reflected measurement signal 16, the reflection of the measurement signal 15 may be carried out at the test device 10 by means of a reflective surface 19. The reflective surface 19 reflects the measurement signal 15, that is to say is reflective for radar waves and/or ultrasound waves. The reflective surface 19 may be provided here by a reflection element 20, which during the reflection is moved back and forth in a translational manner along a movement axis 22 by a drive device 21, so that a translational periodic relative movement 23 of the reflection element 20, and consequently of the reflective surface 19, is obtained. The relative movement 23 has in this case a directional component that points toward the detection device 11. With preference, the movement axis 22 is aligned with the detection device 11, whereby particularly effective operation is obtained. The so-called Doppler effect hereby produces in the reflection of the measurement signal 15 a frequency change or frequency shift in the reflected measurement signal 16 with respect to the measurement signal 15. With respect to the at least one stationary object 18 in the background, the reflected measurement signal 16 of the test device 10 consequently has the frequency shift or the influence of the Doppler effect, which corresponds to the speed signature. This speed signature can be recognized in the measurement data 14, so that the test device 10 can be identified in the measurement data 14 on the basis of the speed signature.

The test device 10 does not have to be moved here in the surrounding area 13, but may be stationary on the ground in the surrounding area 13. All that is necessary is the movement of the reflection element 20, which can be moved with respect to a remainder 20', for example a housing, of the test device 10.

Figure 2:
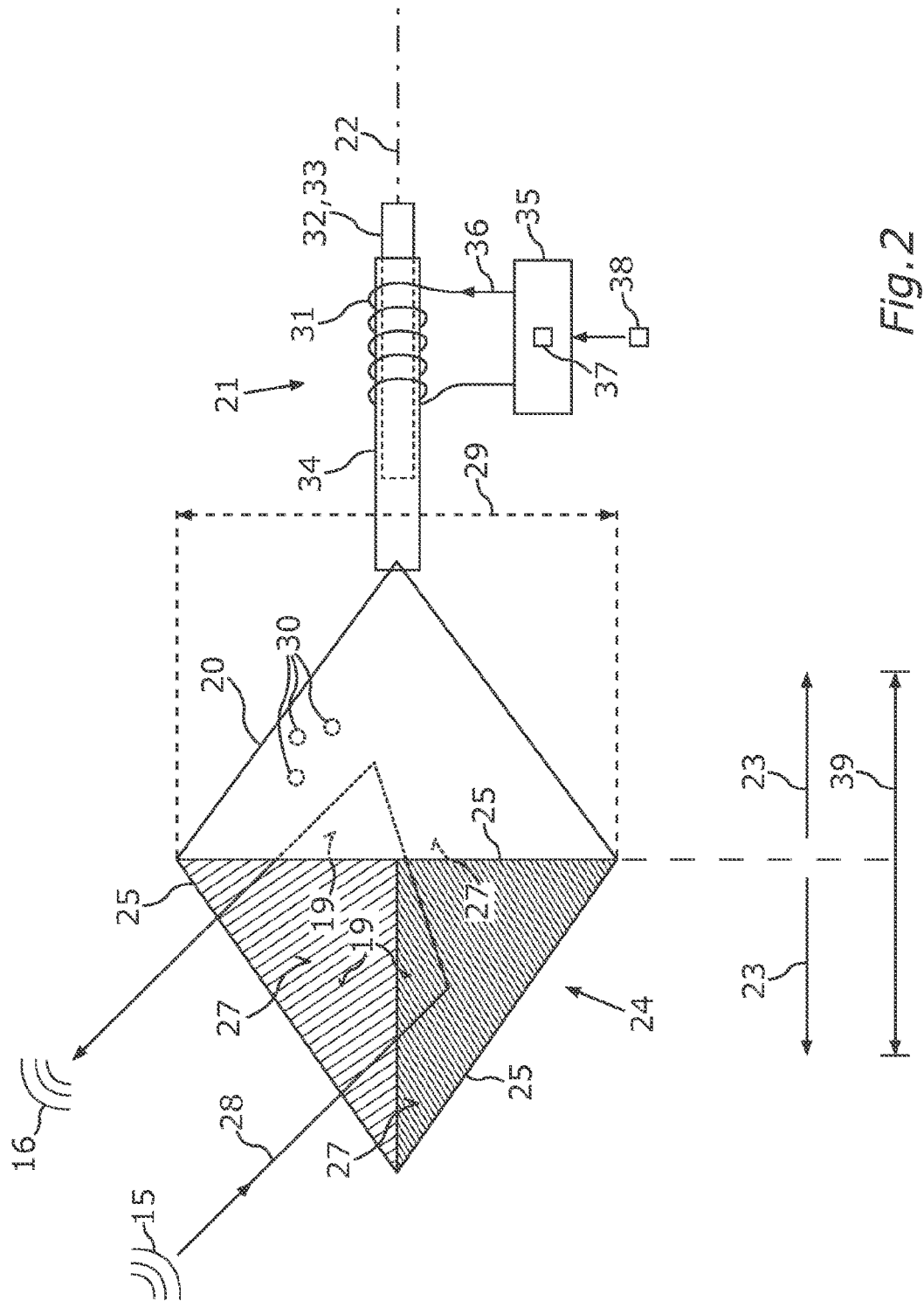
FIG. 2 shows a schematic representation of a reflection element and a drive device as can be provided in the test device from FIG. 1.

FIG. 2 illustrates a possible design of the reflection element 20 and of a possible drive device 21.

The reflection element 20 may for example have a funnel shape 24, which may be formed by three funnel walls 25, which may in each case be planar and arranged perpendicularly to one another in pairs. These funnel walls 25 provide funnel inner sides 27, by which altogether the reflective surface 19 can be realized. The described funnel shape 24 may altogether realize a so-called corner reflector, the functional principle of which is illustrated in FIG. 2. Irrespective of whether or not the movement axis 22 is aligned exactly with the detection device 11, the measurement signal 15, of which a propagation path 28 is illustrated in FIG. 2, can be reflected by double reflection at the surface 19 back in that direction from which the measurement signal 15 came, so that the reflected measurement signal 16 reliably reaches the detection device 11.

An outer dimension 29 of the reflection element 20 with its reflective surface 19 may lie here in a range from 3 centimeters to 50 centimeters.

The reflective surface may for example be realized on the basis of a diaphragm, through which the funnel walls 25 may be made to extend. The funnel walls 25 may also be realized on the basis of a metal body or a metal-coated, nonmetallic supporting body. The reflection element 20 may optionally have a perforation 30, which may provide through-openings, of which only three through-openings are illustrated in FIG. 2 for the sake of overall clarity.

The drive device 21 may be realized on the basis of an electrical plunger coil 31, which may be arranged on a permanent magnet 32 and/or on a further electrical coil 33. The plunger coil 31 may for example be wound around a tube 34, by way of which the plunger coil 31 can be mechanically connected rigidly to the reflection element 20. An electrical driver circuit 35 may drive a coil current 36 through the plunger coil 31. A magnetic field which can be generated by the permanent magnet 32 and/or the further coil 33 then produces in a way known per se a force by which the plunger coil and with it the reflection element 20 can be moved. For example, a sinusoidal profile of a current intensity of the coil current 36 may be brought about by the driver circuit 35. A resultant oscillation frequency or period duration 37 may be specified or set here for example by an actuating signal 38. As a result, the movement 23 of the reflection element 20 can be synchronized with the measurement signal 15 or with the generation of the measurement signal 15 by the detection device 11. A movement interval or a movement stroke 39 of the movement 23, that is to say the distance between the points of inflection of the periodic movement 23 may be less than 20 centimeters.

Instead of the described funnel shape 24, some other shape may also be specified, for example a flat or planar surface 19.

Figure 3:
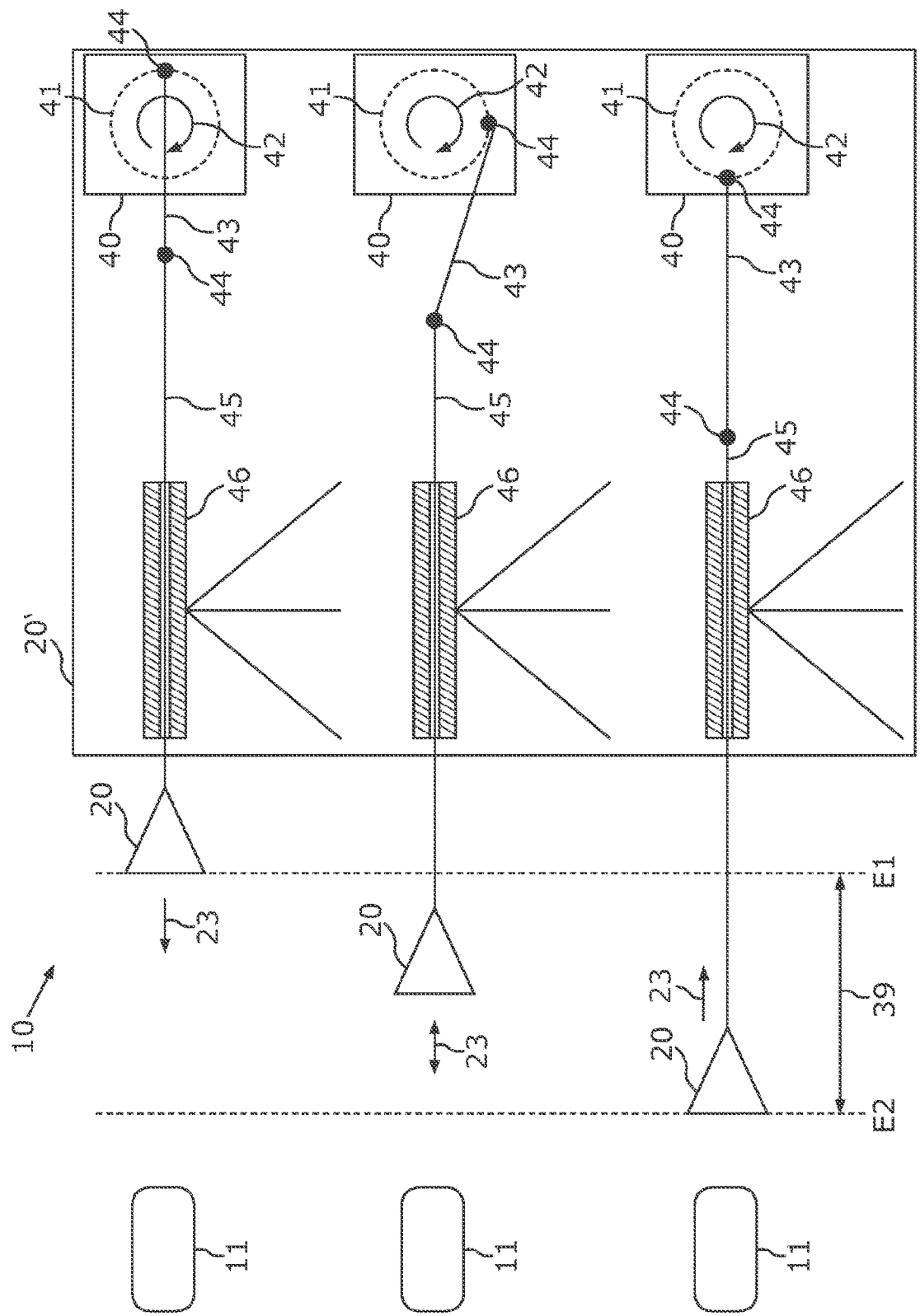
FIG. 3 shows a schematic representation of a reflection element and an alternative drive device during three different phases of movement as can be realized in the test device from FIG. 1.

FIG. 3 illustrates an alternative design of the drive device 21. Three phases P1, P2, P3 of the movement 23 are shown. The movement 23 takes the reflection element 20 back and forth between two extreme points E1, E2. The movement from one extreme point to the other extreme point and back gives altogether a period of the periodic movement 23.

The drive device 21 may have a rotary motor 40, which may have a rotor 41, which can carry out a rotational movement 42. A rotational frequency or period duration of the rotational movement 42 may correspond here to the period duration 37. The rotor 41 may be coupled to the reflection element 20 by way of a rod element 43. For this purpose, the rod element 43 may be mounted by way of two bearings 44. It is shown in FIG. 3 that the rod element 43 does not have to be connected directly to the reflection element 20, but instead a coupling element 45, for example a further rod, may be provided. The rod element 23 may be realized on the basis of a rod, for example a metal rod or a bar. In order to transform the rotational movement 42 into the linear translational movement 23, for example a guiding element 46, which may be realized for example on the basis of a rail or a tube, may also be provided.

Figure 4:
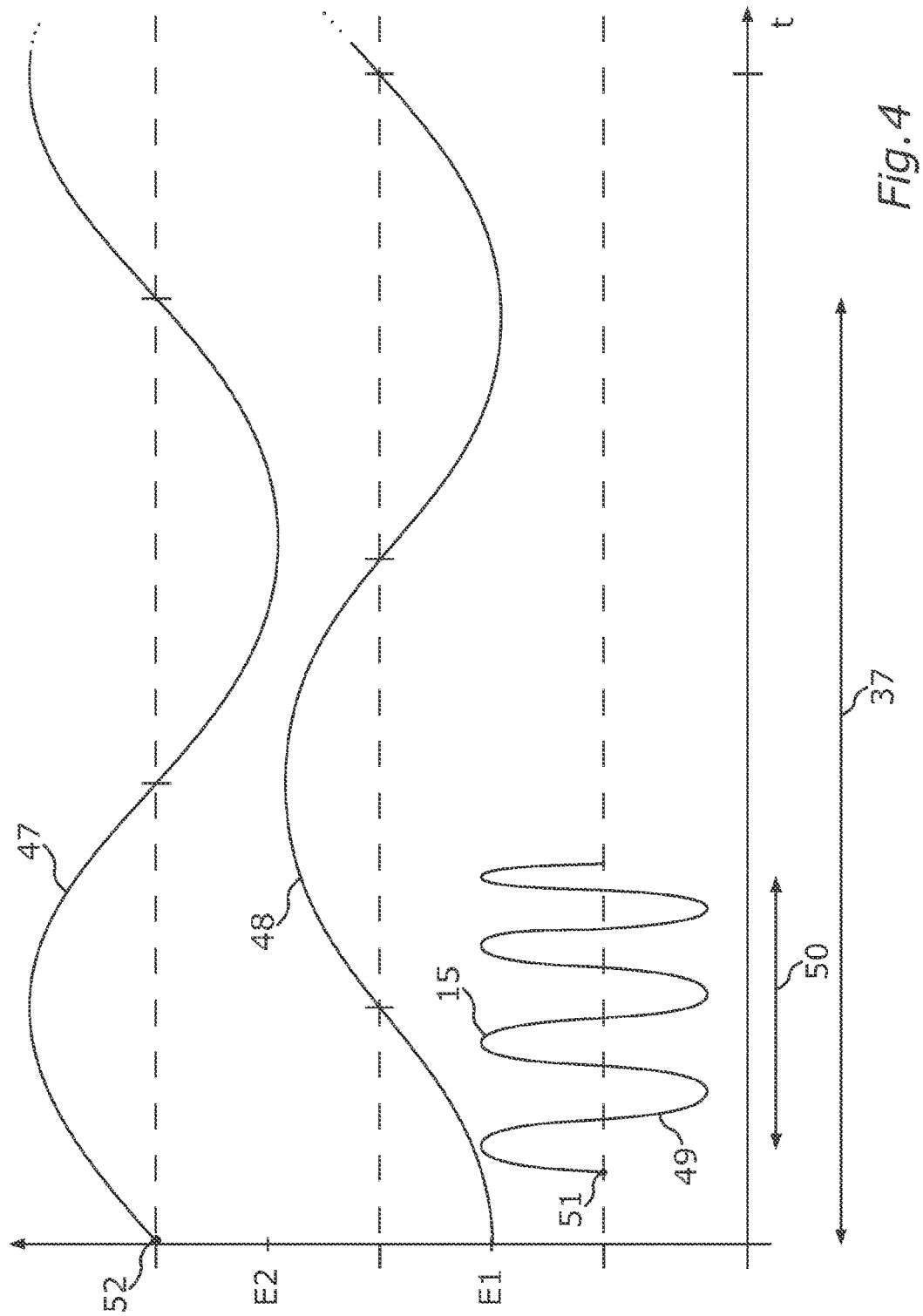
FIG. 4 shows a diagram with a schematic time lapse of a location profile, a speed profile and a measurement signal.

FIG. 4 illustrates how the measurement signal 15 and the movement 23 can be coordinated with one another, which can happen by means of the actuating signal 38 (see FIG. 2). Shown over time t are a speed profile 47 of the movement 23 and a resultant location profile 48 of the position of the reflection element 20 between the extreme points E1 and E2. Also shown is an amplitude profile of the measurement signal 15, which in FIG. 4 may be realized for example as a chirp function 49. It is also illustrated that the period duration 37 may be indicated for example between two zero points or zero transitions of the same orientation of the speed profile 47. The period duration 37 may in this case be at least twice as great as a time duration 50 of the measurement signal 15 of a measuring cycle or measuring run of the detection device 11. As illustrated in FIG. 4, it is thereby ensured that it is possible to run through the measurement signal 15, that is to say the chirp function 49 completely, while the movement 23 proceeds continuously in one direction, for example only forward or only back. A further synchronization of the movement 23 with the measurement signal 15 may take place, in order that a starting point in time 51 of the measurement signal 15 can also have a predetermined relative time shift with a beginning of movement 52 of the movement 23.

The imparting of the described speed signature S takes place in the way described by means of the Doppler effect, for which reason the described test device 10 may also be referred to as a Doppler generator. The Doppler generator may be realized on the principle of a loudspeaker with a plunger coil or by means of some other drive device as a linearly movable reflection element 20. The reflection element may have here for example an oscillating diaphragm. This diaphragm may be metallized, in order to provide the reflective surface 19.

With the described design, the test device 10 has proven to be mechanically robust. It is capable of providing a constant radar cross-section, which can be fixed by the outer dimension 29. In addition, not just a single Doppler signature but an entire speed range, which can be realized by the sinusoidal speed profile 47 (see FIG. 4), can be generated during operation of the test device.

Altogether, the example shows how an acoustic Doppler generator for radar and/or ultrasound can be provided by the invention.

LIST OF REFERENCE CHARACTERS

10 Test device
11 Detection device
12 Motor vehicle
13 Surrounding area
14 Measurement data
15 Measurement signal
16 Reflected measurement signal
17 Testing device
18 Object in the background
19 Reflective surface
20 Reflection element
20' Remainder of the test device
21 Drive device
22 Movement axis
23 Movement
24 Funnel shape
25 Funnel wall
27 Funnel inner side
28 Propagation path
29 Outer dimension
30 Perforation
31 Plunger coil
32 Permanent magnet
33 Electrical coil
34 Tube
35 Driver circuit
36 Coil current
37 Period duration
38 Actuating signal
39 Movement stroke
40 Rotary motor
41 Rotor
42 Rotational movement
43 Rod element
44 Bearing
45 Coupling element 46 Guiding element
47 Speed profile
48 Location profile
49 Chirp function
50 Time duration
51 Starting point in time
52 Beginning of movement
A Distance
E1, E2 Extreme point
P1, P2, P3 Phase of movement
S Speed signature

What is claimed is:

1. A test device for testing a detection device, comprising:
a reflection element with reflective surface, wherein the reflective surface is a radar reflective surface and/or an ultrasound reflective surface; and
a drive device, wherein the reflection element is movable by the drive device periodically back and forth in a translational movement along a movement axis with respect to a housing of the test device;
wherein a movement of the reflection element produces a relative speed unequal to zero of the test device with respect to the detection device;
wherein the reflection element has a funnel shape formed by two or three planar funnel walls and wherein the reflective surface is formed by respective inner sides of the planar funnel walls.

2. The test device according to claim 1, wherein the drive device is configured to set a period duration of the translational movement of the reflection element in dependence on an actuating signal.

3. The test device according to claim 1, wherein the translational movement of the reflection element has a sinusoidal speed profile.

4. The test device according to claim 1, wherein the reflective surface is a metal body or a metal-coated nonmetallic body.

5. The test device according to claim 1, wherein a movement stroke of the translational movement is less than 20 centimeters.

6. The test device according to claim 1, wherein the reflection element has on the reflective surface a perforation.

7. The test device according to claim 1, wherein a cross-section of the reflective surface has a maximum outer dimension in a range from 3 centimeters to 50 centimeters.

8. A method for generating a speed signature in measurement data of a detection device, wherein the test device according to claim 1 is disposed in a surrounding area of the detection device, comprising the steps of:
moving the reflection element periodically back and forth translationally along the movement axis by the drive device with respect to the housing of the test device; and
reflecting back a measurement signal of the detection device to the detection device by the reflective surface of the moved reflection element, wherein the measurement signal is a radar-based measurement signal and/or an ultrasound-based measurement signal.

9. The method according to claim 8, wherein in the measurement signal a ramp function or chirp function has a predetermined time duration and wherein a period duration of the reflection element when moved periodically back and forth is set to be more than twice the predetermined time duration.

10. A test device for testing a detection device, comprising:
a reflection element with reflective surface, wherein the reflective surface is a radar reflective surface and/or an ultrasound reflective surface; and
a drive device, wherein the reflection element is movable by the drive device periodically back and forth in a translational movement along a movement axis with respect to a housing of the test device;
wherein a movement of the reflection element produces a relative speed unequal to zero of the test device with respect to the detection device;
wherein the drive device has a rotary motor, wherein the reflection element is mechanically coupled to a rotor of the rotary motor by a rod element, and wherein a rotational movement of the rotor is transformed into the translational movement of the reflection element.

* * * * *